US006436455B2

(12) United States Patent
Zietlow et al.

(10) Patent No.: US 6,436,455 B2
(45) Date of Patent: *Aug. 20, 2002

(54) MULTI-COLORED AERATED CONFECTIONERY PRODUCTS

(75) Inventors: Philip K. Zietlow, Wayzata; Bernhard van Lengerich, Plymouth; James L. Stinson, Orono, all of MN (US)

(73) Assignee: General Mills, Inc., Minneapolis, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 22 days.

(21) Appl. No.: 09/107,170

(22) Filed: Jun. 15, 1998

(51) Int. Cl.[7] .............................. A23L 1/27; A23G 3/00
(52) U.S. Cl. ...................... 426/104; 426/249; 426/250; 426/571; 426/660
(58) Field of Search ................................. 426/660, 571, 426/470, 249, 250, 104

(56) References Cited

U.S. PATENT DOCUMENTS

| | | | | |
|---|---|---|---|---|
| 1,566,329 A | * | 12/1925 | Laskey | 426/660 |
| D95,341 S | * | 4/1935 | O'Cal Hanson | |
| 2,142,088 A | * | 1/1939 | Anderson | 99/134 |
| 2,187,122 A | * | 1/1940 | Guth | 426/571 |
| 2,238,164 A | * | 4/1941 | Edwards | 426/571 |
| 2,700,943 A | | 2/1955 | Kretchmer | |
| 2,722,177 A | * | 11/1955 | Routh | 107/1 |
| 2,847,311 A | * | 8/1958 | Doumak et al. | 99/134 |
| 2,874,649 A | * | 2/1959 | Pelletier | 107/54 |
| 3,014,437 A | * | 12/1961 | Dutchess | 107/1 |
| 3,062,661 A | * | 11/1962 | Doumak | 99/134 |
| 3,128,724 A | * | 4/1964 | Linder | |
| 3,206,315 A | * | 9/1965 | Anderson et al. | 99/134 |
| 3,220,853 A | * | 11/1965 | Golosinec | 99/134 |
| 3,228,356 A | * | 1/1966 | Schafer | |

(List continued on next page.)

FOREIGN PATENT DOCUMENTS

| | | |
|---|---|---|
| EP | 273 001 | 6/1988 |
| EP | 653 285 | 5/1995 |
| EP | 712 580 | 5/1996 |

(List continued on next page.)

OTHER PUBLICATIONS

Hutt FormPress Installations Brochure, pp. 1–4, 15–22.*
Ali Konis, "Candy Technology", pp. 49–61, 69, 1979.*

(List continued on next page.)

Primary Examiner—Nina Bhat
(74) Attorney, Agent, or Firm—John A. O'Toole; Douglas J. Taylor; Everett G. Diederiks, Jr.

(57) ABSTRACT

A process for making an aerated, confectionery product of multiple colors includes, as a first step, preparing a slurry of water, sugar, and gelatin. The slurry is divided into at least first and second portions or batches having a defined color to provide a second color. A dye or colorant of a color is added to the second portion or batch to provide a second color. Each of the first and second batches are then individually aerated to form first and second aerated streams of first and second colors of substantially identical density and rheological properties. After aeration of the first and second portions, the first and second colored streams are fed to an extrusion die manifold, where they are extruded in disproportionate amounts to form a multicolored a rope having the first and second colors of unequal proportion. A starch anti-sticking agent is applied, and the rope is cut into individual pieces. The individual pieces are then dried to a 1 to 5% moisture content. The process may accommodate two, three, four or more different colors. Multicolored marbits (4–6/g) having disproportionate multiple colored phases can be prepared. The marbits can be consumed as novelty confections or can be added to ready-to-eat breakfast cereals.

30 Claims, 2 Drawing Sheets

U.S. PATENT DOCUMENTS

| | | | | |
|---|---|---|---|---|
| 3,345,186 A | * | 10/1967 | Kania et al. | 99/199 |
| 3,365,331 A | * | 1/1968 | Miller et al. | 127/30 |
| 3,461,822 A | * | 8/1969 | Rikert et al. | 107/54 |
| 3,556,812 A | | 1/1971 | Krohn et al. | |
| 3,607,309 A | | 9/1971 | Olney et al. | |
| 3,649,302 A | * | 3/1972 | Daggy et al. | 99/139 |
| 3,761,213 A | * | 9/1973 | Wight | |
| 3,981,739 A | * | 9/1976 | Omitrovsky et al. | 127/60 |
| 4,097,616 A | | 6/1978 | Guillou et al. | |
| 4,104,405 A | * | 8/1978 | Forkner | |
| 4,120,627 A | | 10/1978 | Abe | |
| 4,152,462 A | | 5/1979 | Hayward et al. | |
| 4,152,463 A | | 5/1979 | Hayward et al. | |
| 4,251,561 A | | 2/1981 | Gajewski | |
| 4,272,558 A | * | 6/1981 | Bouette | 426/660 |
| 4,323,588 A | * | 4/1982 | Vink et al. | 426/564 |
| 4,338,350 A | * | 7/1982 | Chen et al. | 426/658 |
| 4,362,757 A | * | 12/1982 | Chen et al. | 426/599 |
| 4,410,555 A | | 10/1983 | Richardson | |
| 4,415,595 A | | 11/1983 | Takemori et al. | |
| 4,450,179 A | * | 5/1984 | Vink et al. | 426/103 |
| 4,452,419 A | * | 6/1984 | Saleeba | |
| 4,597,980 A | * | 7/1986 | Böttcher et al. | 426/568 |
| 4,600,592 A | * | 7/1986 | Dobis | |
| 4,640,717 A | * | 2/1987 | Shulka et al. | 127/58 |
| 4,648,829 A | * | 3/1987 | Cattani | |
| 4,774,100 A | | 9/1988 | Markwardt et al. | |
| 4,785,551 A | | 11/1988 | Meyer | |
| 4,853,235 A | * | 8/1989 | Tomomatsu | |
| 4,855,146 A | * | 8/1989 | Murakami et al. | |
| 4,911,937 A | * | 3/1990 | Crosello et al. | 426/103 |
| 4,913,924 A | | 4/1990 | Moore | |
| 4,925,380 A | | 5/1990 | Meisner | |
| 4,970,084 A | * | 11/1990 | Pirrotta et al. | 426/289 |
| 5,019,404 A | | 5/1991 | Meisner | |
| 5,030,460 A | | 7/1991 | Baggerly | |
| 5,030,469 A | * | 7/1991 | Mergelsberg | 426/564 |
| D320,300 S | * | 10/1991 | Good et al. | |
| 5,165,949 A | * | 11/1992 | Farnsworth | 426/496 |
| H1322 H | * | 6/1994 | Moore et al. | 426/572 |
| 5,388,772 A | * | 2/1995 | Tsau | 241/17 |
| 5,429,830 A | * | 7/1995 | Janovsky et al. | 426/94 |
| 5,532,017 A | | 7/1996 | O'Donnell et al. | |
| 5,538,748 A | * | 7/1996 | Boatman et al. | 426/516 |
| D376,039 S | * | 12/1996 | Pike | 1/106 |
| 5,580,601 A | * | 12/1996 | Ribadeau-Dumas et al. | 426/660 |
| 5,582,351 A | * | 12/1996 | Isau | 241/17 |
| 5,620,713 A | * | 4/1997 | Rasmussen | |
| 5,789,002 A | | 8/1998 | Duggan et al. | |
| 5,888,567 A | | 3/1999 | Daouse | |
| D410,315 S | * | 6/1999 | Woodward | |
| 5,925,387 A | * | 7/1999 | Gimmler et al. | 426/5 |

FOREIGN PATENT DOCUMENTS

| | | | |
|---|---|---|---|
| EP | 0544904 B1 | * | 10/1996 |
| FR | 847554 | * | 10/1939 |
| FR | 2 211 186 | | 7/1974 |
| GB | 2 143 718 | | 2/1985 |
| WO | WO 97 25881 | | 7/1997 |
| WO | WO 97/27760 | * | 8/1997 |

OTHER PUBLICATIONS

Minifie, "Chocolate, Cocoa and Confectionery"; $2^{nd}$ ed., pp. 424–431, 704–714, 1980.*

Mercier, "Extrusion Cooking", pp. 147–153, 1989.*

Minifie, "Choclate, Cocoa, and Confectionery", $3^{rd}$ ed., pp. 508–512, 539–541, 547–549, 567–574, 1989.*

Van Der Schaaf, Dec. 17, 1974, The Mondomix Process for the Manufacture of Aerated Sugar Confectionery.

1992, Commercial Brochure Bepex Corporation.

* cited by examiner

US 6,436,455 B2

MULTI-COLORED AERATED CONFECTIONERY PRODUCTS

FIELD OF THE INVENTION

The invention is directed generally to food products and to their methods of preparation. In particular, the invention is directed to improved aerated confectionery products of multiple colors such as marshmallows and to processes for making such improved aerated, confectionery products.

BACKGROUND OF THE INVENTION

Aerated confections are popular food items. Some aerated confections comprise a fat constituent while others are substantially free of such fat constituents. An illustrative fat free aerated confection is the common marshmallow. Such marshmallow products are familiar in both larger and smaller sizes.

It is well know that such marshmallows when fresh are soft and pliable but will stale by losing moisture and become hard. Indeed, purposefully pre-dried aerated confections are also well known. These products, particularly in smaller or bit sizes, are popularly commonly added to Ready-To-Eat ("RTE") breakfast cereals, particularly those marketed to children. Due to their small size (i.e., having a number count of 4 to 6/g), these dried aerated confectionery marshmallow products are sometimes colloquially referred to as "Mar." bits or "marbits". The marbits must be pre-dried prior to admixture with the RTE cereal in order to reduce unwanted moisture migration from the marbit to the cereal and thus to forestall the multiple problems resulting therefrom.

While there are many types of marshmallow on the market, their methods of preparation generally fall into two main process groups: extruded marshmallow and deposited marshmallow. In both types, a sugar syrup and a structuring agent such as an albumin, agar or, preferably a gelatin solution are the two main ingredients. Typically, the sugar syrup is cooled down, and then combined with the gelatin solution to form a slurry. That slurry is then aerated to form a foam, and after aeration, colors and flavors are then added to the foam. The particular marshmallow product may be formed into its final shape by an extrusion process. That is, after aeration, the foam is extruded through a die to form a rope. The die imparts the desired peripheral shape to the extrudate rope. The rope is allowed to rest briefly to stiffen, and then is cut into desired sizes. For dried marshmallows, the process can additionally include one or more drying steps. (See, for example U.S. Pat. No. 4,785,551 issued Nov. 2, 1988 to W. J. Meyer entitled "Method of Drying Confection Pieces").

While marshmallows of a single color are most common, marshmallows having two or even a plurality of colors (collectively herein, "multi-colored") are also known (see, for example, D 376,039 issued Dec. 3, 1996 entitled "Food Product" showing a two color marbit design) as well as methods for their preparation. (See, for example, U.S. Pat. No. 4,925,380 issued Oct. 20, 1986 entitled "Multicolor Confection Extrusion System and 5,019,404 issued Feb. 28, 1990 entitled "Multicolor Confection Extrusion System", each of which are incorporated herein by reference). Both the '404 and '380 well describe the difficulties and sensitivities of such foam product preparation. The conventional processes for making multi-colored marshmallows, teach to divide the aerated foam into a plurality of substreams, to admix a colorant into each substream create a desired color, and then extrude these colored substreams in substantially equal portions into a single rope.

While useful, these known processes necessarily have limitations. Foremost among these limitations is that the differently colored sub-streams must be combined in substantially equal proportions (e.g., 1:1 for two colors; 1:1:1 for three colors, etc.). This requirement limits the artistic freedom in finished products wherein substantially unequal proportions of color might be desired, e.g., a two color design comprising ⅔ of one color and ⅓ of the second, or even more unbalanced, namely, 95% of the first color and only 5% of the second. The prior art requirement for equal proportions of each color is due to the peculiarly compressible nature of the marshmallow foams such that even slight variations in pressure and shear, such as resulting from even small differences in piping size, length or that result from attempts to restrict flow rates, have amplified effects on the texture and rheological properties of the foam. As a consequence, known methods cannot provide multicolored marshmallow products having unequal proportions of each color. In particular, such problems are even more severe in connection with the provision of multicolored marbits due to the inherent difficulties of such miniaturization.

Given the state of the art, there is a continuing need for new and useful processes for the production of multi-colored marshmallow products wherein the colored phases are of unequal proportion. Accordingly, it is an object of the present invention to provide methods for the production of multicolored marshmallows of disparately proportioned colored phases.

Still another object of the present invention is to provide novel multi-colored marshmallows characterized by color phases of unequal distribution.

It is a further object of the present invention to provide methods for the preparation of multicolored marbits having disparately proportioned colored phases.

Still another object of the present invention is to provide novel multi-colored marbits characterized by color phases of unequal proportion.

Surprisingly, the above objects can be realized and novel multicolored marshmallows and marbits of unequally proportioned color phase can be provided as well as methods for their preparation.

SUMMARY OF THE INVENTION

In its product aspect, the present invention resides in aerated confections having a plurality of dissimilarly colored phases importantly characterized by being substantially unequal in proportion.

The aerated confections comprise
about 50 to 95% of a saccharide component about 1 to 30% moisture
about 0.5 to 30% of a structuring agent.
The confections have densities of 0.10 to 0.4 g/cc.
The confections have at least a first phase of a first color ($\chi$) and at least a second phase of a second color ($\gamma$). The weight ratio of the $\chi$ or first color phase and the $\gamma$ or second phase are substantially unequal. By substantially unequal it is meant that $\chi/\gamma > 1.1$.

Novel marbits are provided additionally characterized by a size count of 3 to 6/g and having a moisture content of 1 to 5%.

In its process aspect, the present invention is directed to processes for making an aerated, confectionery product of multiple colors, particularly of unequal color proportions, that substantially obviates one or more of the problems due to limitations and disadvantages of the prior art. To achieve the advantages of the invention and in accordance with the purposes of the invention, as embodied and broadly directed herein, the invention is directed to a process for making a multi-colored, aerated product.

The process comprising the steps of:
preparing a slurry comprising about 5 to 30% water, about 50% to 95% of a saccharide ingredient, and about 0.5 to 30% of a structuring ingredient having a predetermined first color;
dividing the slurry into at least first and second portions;
separately meter pumping each slurry portion to control the rate of the slurry portion;
admixing a colorant of a color different from the first color into at least one portion to provide a plurality of at least a first and a second differently colored slurry portions;
aerating the first differently colored portion to form a first aerated foam stream of said first color;
aerating the second differently colored portion to form a second aerated foam stream of said second color;
after the step of aerating the second portion, feeding the second aerated foam stream to the die manifold; and
extruding the first and second aerated streams to form a rope of said first and second colors wherein the weight ratio of first stream ("χ") to second stream ("γ") is χ/γ>1.1.

In its batch embodiment, the process includes, as a first step, preparing a slurry of water, sugar(s), and a structuring ingredient such as gelatin. The slurry is divided into at least first and second portions. The portions are formed into disparate colored portions such as by admixing a first dye of a first color to the first portion, and adding a second dye of a second color, which is different from the first color, is added into the second portion. Next, after adding the first dye into the first portion, the first portion is aerated to form a first aerated stream of the first color. After adding the second dye into the second portion, the second portion is aerated to form a second aerated stream of the second color.

In certain preferred implementations, after the step of aerating the first portion, the first aerated stream is conveyed at a controlled flow rate to a die manifold. After aerating the second portion, the second aerated stream is conveyed to a die manifold at a control flow rate. The first and second aerated streams are then extruded to form a rope having phases of the first and second colors importantly characterized by the phases being substantially unequal in proportion.

Preferably, after the step of extruding, the rope is cut into individual pieces to form multicolored wet confection pieces. For the production of marbits, after the step of cutting, the individual pieces are dried to a predetermined moisture content. In certain applications, that predetermined moisture content may be about 1 to 5%.

In one preferred embodiment, the step of dividing the slurry may include dividing the slurry into no fewer than four portions, including a first portion, a second portion, a third portion, and a fourth portion. A different color dye may be then added to each different portion. Each of these portions are then aerated, and extruded to form a rope of four different colors.

It is to be understood that both the foregoing general description and the following detailed description are exemplary and explanatory only and are not restrictive of the invention, as claimed.

The accompanying drawings, which are incorporated in and constitute a part of this specification, illustrates an embodiment of the invention and together with the description, serves to explain the principles of the invention. In the drawing:

DETAILED DESCRIPTION OF THE PREFERRED EMBODIMENT

Figure 1:
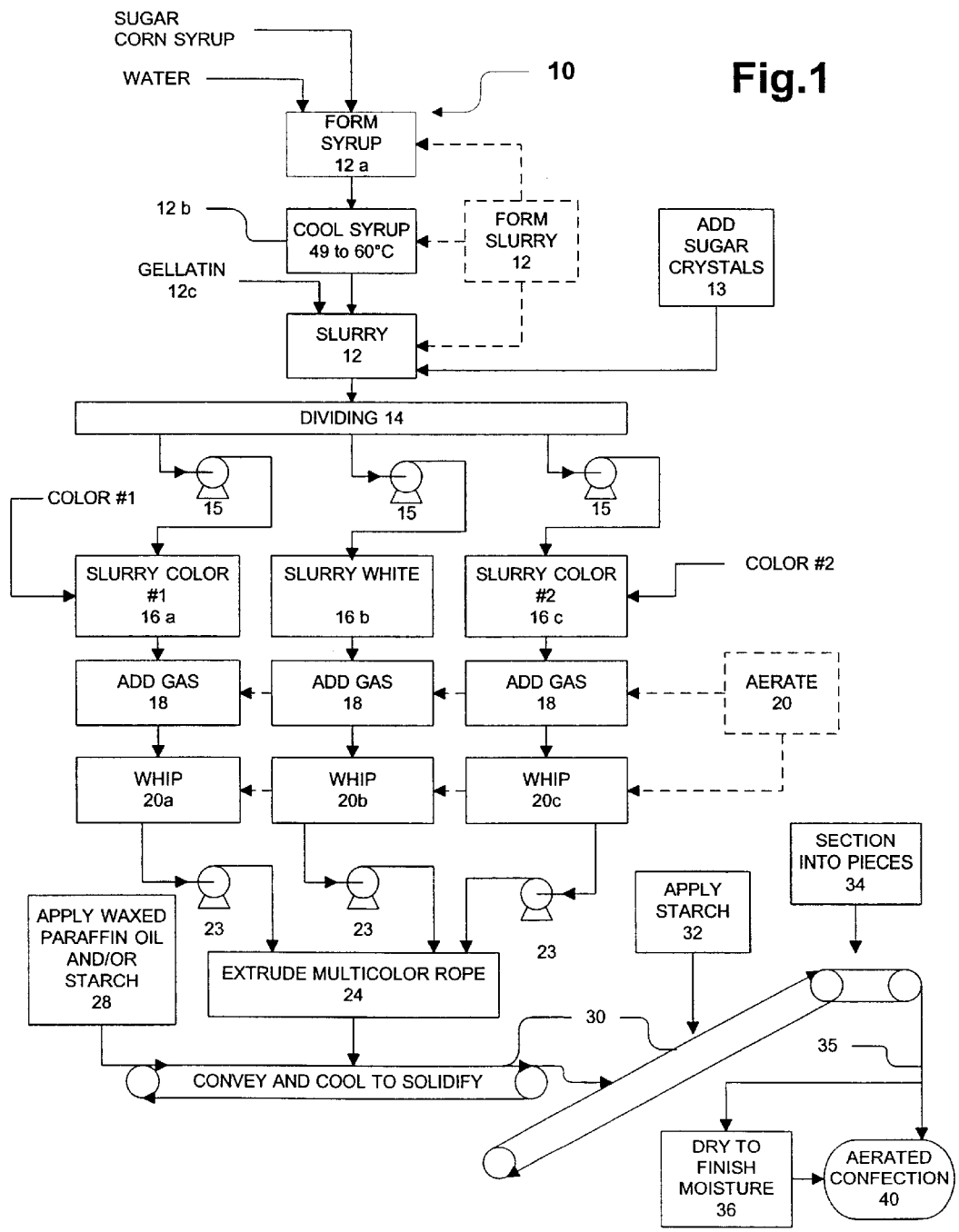
FIG. 1 is a schematic view of one process, embodying the present invention.

The present invention relates to improved multi-colored aerated confections such as marshmallows and marbits characterized by an uneven distribution of the colored phases and to their methods of preparation. Each of the product components as well as product use and attributes and methods of their preparation are described in detail below.

Reference will now be made in detail to the present preferred embodiment of the preferred invention, one example of which is illustrated in the accompanying drawing.

Product

The present invention provides novel aerated confections having at least a plurality, and preferably a multiplicity, of dissimilarly colored phases importantly characterized by being unequal in proportion.

By "aerated confection product" is meant an aerated solid confectionery food product, especially in solid form, having a density in the range of from about 0.10 to about 0.4 g/cc (from about 35 to about 50 ounces per gallon in the confectioner's terminology) and comprising from about 50 to about 95% of a saccharide component, from about 1 to about 30% of water, based on the total weight of the aerated confection product.

By "color" is meant a confection of any color, including white, which may be provided by the base confection ingredients, and by additional artificial or natural coloring agents. "Color" also includes various hues or shades, e.g., pink and red.

The saccharide component may include pure monosaccharide and disaccharide sugars such as sucrose, dextrose (e.g., anhydrous, monohydrate or dextrose syrup) and fructose, as well as hydrolyzed starch syrups such as corn syrup which include dextrin, maltose and dextrose, invert sugar syrups which include levulose and dextrose and/or converted fructose or glucose syrups. A portion of the saccharide component may be supplied by impure or flavored saccharidic ingredients such as fruit juices, purees, honey nectars, concentrated fruit juices, fruit flavors and mixtures thereof.

The confection essentially further includes about 0.5 to 30%, preferably about 1 to 4%, and most preferably about 2.5 weight percent of a structuring or gelling component such as a hydrocolloid ingredient such as pectin, gelatin, modified starches, albumen, gums and mixtures thereof. For products to be marketed in North America, the preferred structuring agent is gelatin.

In one preferred embodiment, the marshmallows are fat free, i.e., have a fat content of less than 0.5% (dry weight basis). In other variations, e.g., chocolates, the aerated confection can comprise a fat constituent such as about 1 to 10% cocoa butter, dairy fat or other edible fatty triglyceride or fat mimics such as sucrose polyesters.

In one variation, the aerated confections can be in the form of a soft marshmallow defined in part by a moisture content of about 10 to 30%, preferably 12 to 18%.

In another variation, the marshmallows are dried to a moisture content of 1 to 5% to form dried marshmallows.

Preferred dried marshmallows are small pieces or marbits having a size count of 3 to 6/g. Snack product variations can range in size from about 1 to 2 g/piece. In view of the low water content, such dried aerated confection products typically have a firm or hard texture, rather than a soft or compliant texture. Marbits generally have a bulk density of about 135 to 340 g per liter.

By being "unequal in proportion" (or equivalently herein "disproportionate" phases) herein is meant that in a two-color product the weight ratio of the two phases is other than a 1:1 or 50:50 relationship, e.g., a 1:20 ratio. For a three-color product, a disproportionate ratio would be other than a 1:1:1. That is, other than wherein each of the phases is substantially equal. Thus a 1:2:1, or a 2:1:1, a 2:1:2 ratio of the phases would all be considered herein as a disproportionate ratio. Most broadly, at least one color will be present in an amount that is at least 10% more or less than at least one other color phase, i.e., the ratio of $\chi/\gamma > 1.1$ where $\chi$ is the weight percent of one color phase and $\gamma$ is the weight percent of a second color phase. In a preferred variation, the proportions of the colored phases are highly unequal, that is $\chi/\gamma$ ranges from about 1.1 to 20 preferably about. In still other variations involving multiple phases, such as a three-color marbit having phases $\chi$, $\gamma$, and z, not only is the weight ratio of $\chi/\gamma \geq 1.1$ by $\gamma/z \geq 1.1$.

Surprisingly, not only can products herein be provided having disproportionate color phases but also this feature can be provided not only in larger pieces but also in miniaturization, e.g., in marbits.

Figure 2:
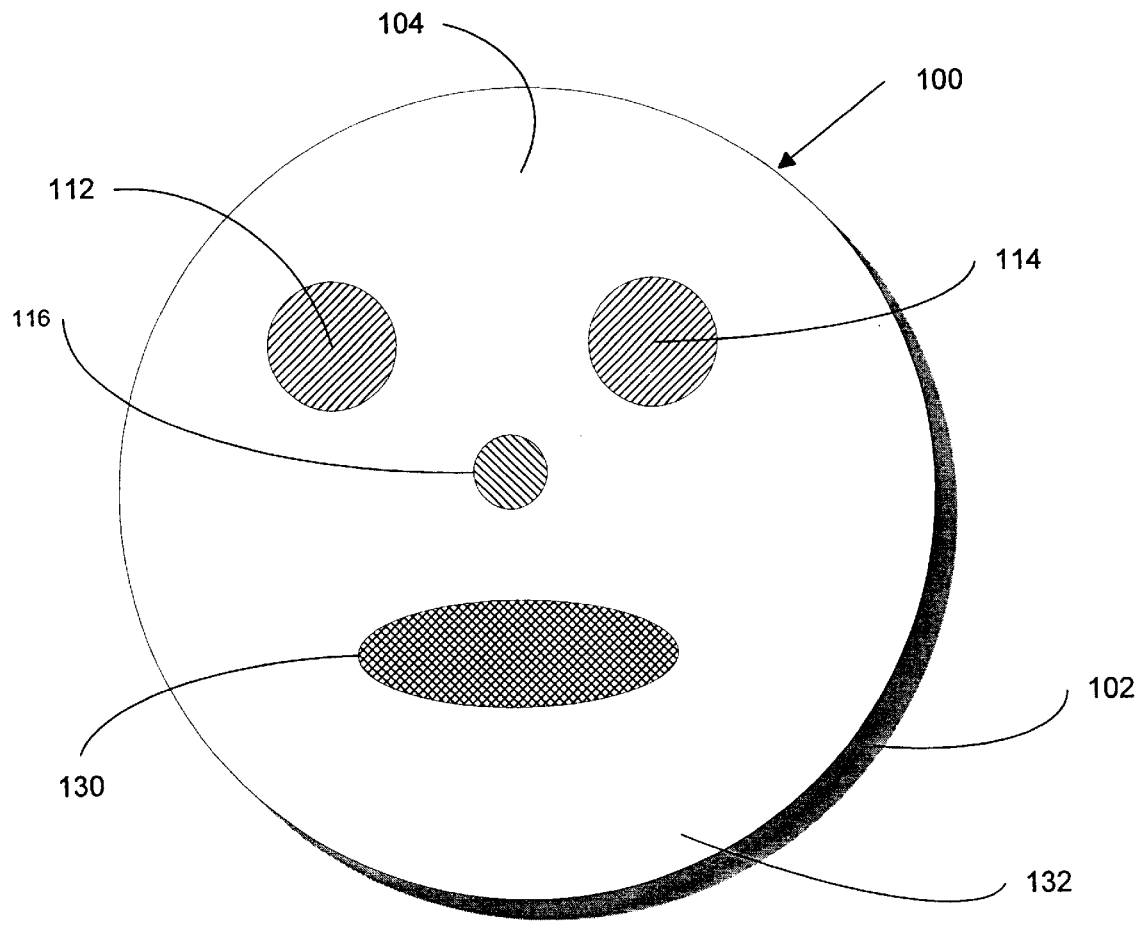
FIG. 2 is a greatly enlarged perspective view of a multi-colored aerated confection of the present invention having a plurality of individually colored faces of unequal proportion.

Reference now is made to FIG. 2 which is a greatly enlarged view of an illustrative novel improved multicolored confectionery piece of the present invention such as a marbit characterized by substantially unequally proportioned colored phases.

The piece is indicated generally by reference numeral 100. As can be seen, multicolored confection piece 100 includes a periphery 102 that defines the general outline of the shape of the piece such as the circular periphery illustrated. The periphery can include all manner of regular and irregular shapes.

The piece 100 has opposed major faces including major face 104.

The skilled artisan will appreciate that both major faces include a pattern 110 thereon. In this simple illustration, pattern 110 is that of a clown face that includes a pair of eyes 112 and 114 that in this simple illustration are represented by first and second spaced circular shapes. The clown face pattern 110 additionally includes a nose feature 116 also in the form of a circle that happens to be concentric with the overall shape of the piece. Finally, pattern 110 includes a mouth feature 130 in the form of an arcuate region positioned intermediate to the nose 116 and the periphery 102 of the marbit. The major face 104 includes a continuous major portion 132 which conveniently can be white ("$\chi$"). The white portion extends throughout the body of marbit piece 100. The white portion 132 can constitute in this illustration about 60 to 90% of the piece.

The eye 112 can be of a second color such as blue ("$\gamma$"). Eye 114 can be of the same blue color as eye 112 or can be of a different color, e.g., yellow. Conveniently, eyes 112 and 114 are each of the same color.

Collectively eyes 112 and 114 constitute about 5% to about 20% of the piece. Thus, the ratio of $\chi/\gamma$ can range from 3 to 18 (60%/20% to 90%/5%).

Nose 116 can be of a third color such as red ("z"). The nose 116 can illustratively comprise 1 to 5% of the piece. Thus the ratio of $\gamma/z$ 1 to 20 (5%/5% to 20%/1%)

The mouth feature 130 can be conveniently of a fourth color such as green. The mouth feature 130 comprises, for example, about 5 to 15% of the piece.

It will be appreciated that the variously colored regions extend throughout the body of the piece 100 and are thus to be distinguished from a mere coloring of or imparting a pattern onto the major faces such as by printing with an edible ink.

Importantly, notwithstanding the various colored phases being present in dissimilar proportion, the confection piece can nonetheless possesses a similar composition throughout the body of the piece. As a result, in a preferred embodiment the texture throughout the piece is uniform.

By similar composition herein it is meant that except for the difference in the colorant, the phases have substantially equivalent moisture level, sugars level, and structuring agent. Also, the texture, density, and foam cell size distribution are very similar among the phases.

In other embodiments, the portions can have dissimilar compositions. The syrup portions can be modified such as by moisture removal or addition of ingredients. For example, a portion can be formulated to dissolve more rapidly in milk. Thus, the clown piece can be provided to have eyes or nose features that dissolve more quickly to provide an amusing disappearing feature.

Method of Preparation

In accordance with the invention, the invention is further directed to processes for making the above described multicolored aerated confection product. The process essentially includes aerating a plurality of separate, individually colored marshmallow slurries just prior to the extrusion step. Individual colors are added to individual streams of a single batch(es) prior to aerating the product. This results in advantages of having a product which is easier to control because the step of aeration is essentially the last step prior to extruding.

In preferred variations a substantially uniform temperature is maintained throughout the process, which avoids crystallization and other problems.

FIG. 1 illustrates a schematic of one embodiment of a process for the present invention, generally designated by reference numeral 10. The first step for making a multicolored, aerated confection product, is preparing a marshmallow syrup or slurry 12 in amounts sufficient to supply all the disparately colored substreams. The slurry essentially includes a sugar syrup and the structuring or gelling agent. In a preferred embodiment, the slurry preparation step itself comprises substeps of providing a sugar syrup 12a, cooling the sugar syrup to a temperature of about 150 to 210° F. (65 to 99° C.) 12b, and admixing the gelling agent dissolved or dispersed in an aqueous carrier having a temperature of 120 to 180° F. with the sugar syrup to form 12c the marshmallow slurry. The sugar syrup can be formed from water and sugar, and a portion of corn syrup which is then heated to sufficiently dissolve the sugar, but to avoid burning. The syrup can conveniently be formed in batches such as in a mixing kettle or continuously in suitable continuous cookers and is heated until it has a moisture content of 5 to 30%, preferably 10 to 15%, by weight (115.5 to 121.1° C.; 240 to 250° F.). The sugar syrup can then conveniently be cooled to about 93 to 99° C. (200 to 210° F.) and corn syrup admixed therewith to form the syrup 12a. After the syrup 12a is formed, the syrup 12a can be cooled to about 65 to 85° C. (150 to 185° F.) to which the warm aqueous solution or dispersion of the suitable gelling agent is added. The slurry 12 so prepared has a moisture content at or above the final desired moisture content of the final product. In one variation, the step can optionally comprise admixing or seeding the slurry with sugar crystals. The sugar crystals can be seeded to either the slurry (i.e., after adding the gelatin structuring ingredient) or the sugar syrup (i.e., before addition of the gelatin). The sugar crystals can be added at about 1 to 30%, preferably about 10 to 20%, and most preferably about 15 to 17%. The sugar should be less than 150 μm in size, preferably 100 μm or less in size. Sugar of the preferred particle size range is commercially available as "Baker's special" type of ground sugar. As the amount of ground sugar seeding increases, the finished dried confections' texture becomes desirably more frangible.

The present inventive process additionally essentially includes the step of dividing 14 the slurry into and forming at least first and second batches or portions 16. The skilled artisan will appreciate that the current methods can be practiced as a batch process, a continuous process or as a semi-continuous process. The term "portions" is used broadly herein to refer to any particular practicing technique whether batch, continuous or semi-continuous. The slurry is divided into at least as many different portions or batches as different colors desired. This may include a plurality of as few as two, or as illustrated in the figure, a multiplicity of three or more, including 16a, 16b and 16c. The upper number ("n") individual substreams of slurry is not critical. Importantly, by employment of individual metering pumps, 15 for each substream, great control can be obtained over the relative proportion of one substream to another. Moreover, the flow rates and amounts of the individual substreams or portions can vary widely.

Conveniently, the step of subdividing the master batch or supply of marshmallow slurry into substreams, batches, etc. of slurry can be practiced by pumping a portion of the slurry from a master slurry make up kettle into individual hoppers or kettles. There is at least one different hopper or kettle per different color. In a continuous preparation variation, suitable valving or manifolds or other means for dividing the slurry can be employed to divide the marshmallow slurry into the desired number of substreams.

Next, the present methods essentially further comprise adding food dye or colorant to at least one of the unaerated slurry substreams 16 based upon the desired colors to provide at least two, preferably a plurality, and most preferably a multiplicity of individually colored substreams or portions. The colorant can be a finely divided particulate, or preferably is a water soluble dye. While maintaining the slurry at a temperature sufficient to prevent crystallization and allow for optimum mixing, liquid food dye is mixed into the slurry sufficient to obtain the desired shade, brightness, and depth of color. Preferably, slurry substreams or portions are kept at about 60° C. (140° F.) while the food dye is added at a ratio of slurry to dye of about 200 to 400:1, preferably about 300:1. For example, in a batch operation involving individual kettles for each colored slurry, the kettles can conveniently be kept at their temperature of about 60° C. (140° F.) by jacketing them with recirculating hot water. In a continuous preparation variation, the admixing step can be conveniently practiced using in-line static mixers. After the food dye is added to each of the slurries in each of the hoppers, each of the colored slurries has a density of about 1.3 to 1.4 g/cc.

Next, the individual colored substreams can be separately pumped using a metering pump 15 to supply the desired volumes (amounts) of the slurry. The pumps can be conveniently placed upstream of the color addition step or after the color addition step. By using individual metering pumps to control the quantity of slurry, many problems in the prior art regarding control of the aerated foam can be overcome.

Thereafter, the present methods further essentially comprise the step of aerating 20 the first, second, etc. differently colored portions 16a, 16b, 16c to form first, second, etc., aerated foam streams 18 such as 20a, 20b, 20c. Conveniently, as depicted in FIG. 1, in the preferred embodiment, the aerating step 20 involves the substeps of adding a gas 18 to the colored slurry portion of substream (16a, 16b, 16c) and whipping or agitating the gas laden colored slurry portions to form at least a plurality of individually colored aerated foam streams or portions 20a, 20b and 20c.

Just prior to entering the aerator, each colored supply portion or substream crosses a T-junction in the pipes where a gas supply injects gas into the batch. The gas can be nitrogen gas or clean air or other suitable gas. By "clean air", it is meant a de-watered and de-oiled air. The gas is kept at room temperature and a suitable pressure such as at a pressure of 120 to 2,400 Kpa (40 to 150 psig). After the gas is injected at the T-junction, each of the colored batches along with the injected gas enters its respective aerator.

Conveniently, each aerator 20 can be a vertically oriented mixing machine, which is jacketed and maintained at about 21 to 82° C. (70 to 180° F.). Each aerator can include an outer casing with a series of inwardly projecting spikes cantilevered from the casing wall. Mounted in the center of the casing is a rotating drum, also having a series of outwardly projecting spikes cantilevered from the drum outer wall. The spikes on the drum wall rotate with the drum and pass between the spikes on the casing wall. The drum is connected to a motor which rotates the drum at a speed suitable to adequately mix the colored batch and gas to obtain the desired density (e.g., 100 to 1000 rpm). The aerator may also be mounted horizontally.

The aeration step is performed such as to provide a plurality of disparately colored foam streams having in the preferred embodiment, substantially identical rheological properties such as density, temperature and viscosity.

After aeration 20, each of the mixtures exit each of the aerators as an aerated stream or foam of whatever colorant color was mixed into that particular batch or portion. Each of the streams has a density, at this point, of 0.15 to 0.4 g/cc and a temperature of about 50 to 60° C., preferably 54.5° C. (130° F.).

The skilled artisan will appreciate that the present process and equipment configuration to practice the process does not include conventional in-line static mixers intermediate the aeration and extrusion steps and equipment used to practice these steps.

The present methods next essentially include the step of extruding 24 the substreams of aerated foam to form a multicolored extrudate rope.

This extruding step can be practiced by each of the colored aerated streams conveyed to an extrusion die manifold. If desired, the streams can be divided into even smaller substreams prior to reaching the extrusion manifolds, depending upon what combination of colors are desired in each of the die ports. One example of a suitable extrusion die manifold is a BT2000 manifold, available from Buro-Technick 2000, B.V. The BT2000 has about 10 die ports, and one needle valve per die port. The needle valves allow for adjustment of the flow through the die of each aerated stream.

Each of the aerated substreams are fed into one die port. Each of the die ports has multiple die plates, in order to even out the pressure during the extrusion process and to impart the desired color pattern into the extrudate rope to be formed therefrom. Each of the manifolds extrudes one multicolored extrudate confection rope per die port. The ropes have as many different colors as there were different colors of aerated streams put through the die port. For example, in one embodiment, four aerated streams of four different colors are fed into one die port. The resulting extruded rope is a poly phasic rope made up of four phases or portions of these same four different colors.

The aerated multicolored confection blend is discharged from the extrusion orifices of the compound extrusion head at a temperature which is generally in the range of from about 21 to 82° C. (70° F. to about 180° F.). At higher temperatures, i.e., above 57° C. (155° F.), the product rope tends to slump after discharge, while at temperatures below about 26° C. (80° F.), power requirements required for extrusion may become excessive. Also, as the moisture level decreases, the foam is stiffer at a given temperature.

While not critical, it has been found that in a specific embodiment about 2 to 5 m/min of rope are extruded under this process.

Still referring to FIG. 1, it is seen that the present methods next further essentially include the step of conveying and cooling 30 the hot extrudate rope away from the extruder.

Conveniently, this step can be practiced by having each of the ropes extruded onto first an endless conveyor belt. The conveyor belt can be, and preferably is coated with a sufficient non-stick coating and/or starch in order to prevent the rope from sticking to the belt, e.g., rubber. As is well known, the warm aerated foam ropes are very sticky and easily damaged. It has been found that a beeswax fortified paraffin (e.g., 25% beeswax, 75% paraffin or mineral oil) coating warm enough to be in liquid form on the belt is surprisingly effective at preventing 1) adherence of the foam to the belt, 2) minimizing undesirable deformation of the extrudate rope, and 3) contamination of the rope with undesirable anti-stick materials.

In an inventive embodiment illustrated in FIG. 1, the methods involve applying a layer of waxed paraffin oil 28 to the belt. By "waxed paraffin oil" is meant a blend of beeswax and paraffin ranging from about 1 to 25% beeswax and the balance paraffin and/or mineral oil. In even more preferred variations the layer of oil is about 0.1 to 0.5 mm in thickness. The paraffined oil is applied at a temperature of at least 40° C., preferably above its melting point to a temperature about equal to the temperature of the extruded confectionery rope. The melting point of the beeswax paraffin oil ranges from about 40 to 60° C. As a result, the waxed paraffin oil is liquid but highly viscous.

The length and speed of the belt is controlled such that each of the ropes have a sufficient time to set, cool and gel or solidify. Cooling times can range from about 0.5 to 6 minutes, preferably about 2 minutes.

In the next step, prior to cutting or severing, and therefore prior to substantial gelling, the methods herein essentially further include the step of product of substantially uniformly coated with an anti-sticking agent such as powdered starch or a powdered, starch-sugar mixture 32 to facilitate cutting and also to provide a desired surface condition which prevents sticking of the product strands, or the severed product pieces to each other. One way of practicing this step is by applying a starch coating (with or without sugar). In FIG. 1 the first endless conveyer belt deposits each of the ropes onto a second endless conveyer belt, which is covered with a bed of a modified corn starch. The rope is conveyed on the starch covered belt to a starch applicator. Starch applicator deposits a top coating of starch over each of the ropes. Preferably, about ¼ to ¾ of an inch of starch is applied.

Next, the present methods essentially include the step of sectioning 34 multicolored ropes into individual pieces without substantially intermingling the differently colored zones of the strands to produce multicolored confection products. This may be accomplished by any suitable slicer which will adequately transversely section or sever the ropes, without causing the ropes to stick to a cutter or to promote bleeding of the colors within each other. In the preferred embodiment, the cutter is a guillotine-type reciprocating vertical cutter having a plastic blade.

After the ropes are cut into individual pieces, each of the individual pieces can be put through a scalper (not shown) to separate the starch from the pieces. The starch is captured and recirculated.

In the manufacture of soft marshmallow or other soft confections, the finished products so prepared are ready for conventional packaging for distribution for sale.

However, in the preparation of a dried aerated confection such as the marbit, the present methods additionally comprise a finish drying step 36 and each of the individual and destarched pieces can be dried. Any suitable drying technique which will remove the moisture content to be about 2–4% is adequate. A suitable method is taught in U.S. Pat. No. 4,785,551 entitled "Method of Drying Confection Pieces" which is incorporated herein by reference. The '551 patent teaches a rapid, five minute drying step using a two-step fluidized bed heating step. In another preferred technique, the marbits are dried at a slower rate using forced hot air convection drying. For example, the pieces can be put on trays, mounted in a frame that holds about 30–40 trays, and rolled into a drying room until adequately dried. The drying room is kept at a temperature of about 82.2° C. (180° F.). In other implementations, the pieces are transported by a conveyor through a drying room or tunnel until the desired moisture content is reached.

The resulting dried pieces 40 can then be consumed as confections

The multicolored marbit pieces 40 find particular suitability for use as an appealing added component of food products. For example, the pieces may be added to a Ready-To-Eat ("R-T-E") breakfast cereal, especially sugar coated R-T-E cereals intended as children's breakfast cereals.

In a preferred embodiment, the finished RTE cereal can comprise about 65 to 99% of a conventional dried cereal (such as flakes, shreds, puffs formed from a cooked cereal grain or dough of oats, wheat, corn, barley, rice or mixtures) and about 1% to about 35% by weight of the present novel marbits, preferably about 20 to 30%.

An example of one implementation of the inventive process is as follows:

EXAMPLE 1

A slurry was prepared by mixing in a mixing kettle 33 pounds of water, 100 pounds of sugar, and 33 pounds of corn syrup. This mixture was heated to 118.3° C. (245° F.) for a half hour to 45 minutes. This mixture was then cooled down to 96.1° C. (205° F.), and 15 kg (33 pounds) of corn syrup was added. The mixture was brought down to about 82.2° C. (180° F.). 2.95 kg (6.5 pounds) of water, pre-heated to 82.2° C. (180° F.), was added, along with 1.36 kg (3 pounds) of gelatin. The gelatin was Super Whip, having a 250 bloom strength, and available from Vyse Gelatin Company. This made about 91 kg (200 pounds) of slurry and gelatin.

The slurry was divided into four different hoppers. Each hopper was filled with about 20 kg (45 pounds) of the slurry and gelatin mixture. 60–70 grams of liquid food dye was added to each of the four hoppers. A red dye was added to the first hopper, a blue dye was added to the second hopper, a green dye was added to the third hopper, and a yellow dye was added to the fourth hopper. Each of the liquid food dyes was mixed into the slurry, while the hoppers were kept at a temperature of 60° C. (140° F.). After mixing, the density of each of the colored batches was about 1.1 g/cc.

Each of the dyed batches was pumped with a separate metering positive displacement pump to an individual aerator for each batch or stream. Just prior to entering the aerator, nitrogen gas (20° C. and a pressure of 1,140 kPa (150 psig) was injected into the colored batches. Each aerator was kept at a temperature of about 48.8° C. (120° F.), and run at 600 rpm. Each of the colored aerated streams exited each of the aerators at a temperature of about 54.4° C. (130° F.), and a density of 0.246 g/cc.

Each of the aerated streams was pumped through a jacketed pipe kept at a temperature of 48.8° C. (120° F.). Each of the streams was pumped to a BT2000 manifold, jacketed at 48.8° C. (120° F.). Four streams were fed into one of the die ports, and a rope was extruded through the die plates onto a wax belt. The amount of each stream was controlled such that the amounts of each stream were substantially unequal. The resulting rope was made of the four different colors, red, blue, yellow, and green. The rope was fed down the wax belt for about 10 m (30 feet) such that after five minutes, it was deposited onto a starch covered belt. The starch covered belt transported the rope to a starch applicator, which covered the rope with about ¼ to ¾ of an inch of starch.

A vertical cutter with a plastic blade cut the rope into individual pieces. Each of the individual pieces then went into a scalper, which separated the starch from the pieces. The starch was captured and recirculated.

Each of the pieces was then put on trays (0.5 m$^2$) and mounted in a frame that holds about 30 to 40 trays. The frame was rolled into a drying room and dried until the moisture content was about 2 to 4%.

We claim:

1. An aerated marshmallow confection piece having a plurality of phases of distinct colors within an overall body of the aerated confection piece comprising:
    a first confection phase ("$\chi$") having a first color,
    a second confection phase having a second ("$\gamma$") color which is different from the first color, wherein the first and second confection phases are spaced within the body, extend within the body and are of unequal proportion, wherein the first and second confection phases have first and second compositions respectively, wherein the first and second compositions dissolve at differing rates when the aerated confection piece is placed in a liquid.

2. The aerated confection piece of claim 1 wherein the weight ratio of the first confection phase to the second confection phase is $\chi/\gamma>1.1$.

3. The aerated confection piece of claim 2 wherein the weight ratio of the first confection phase to the second confection phase is $\chi/\gamma>1.5$.

4. The aerated confection piece of claim 3 wherein the weight ratio of the first confection phase to the second confection phase ranges from about 1.5 to 20.

5. The aerated confection piece of claim 4 in the form of a blend additionally comprising about 65 to 99% of a ready-to-eat cereal.

6. The aerated confection piece of claim 1 wherein the first and second confection phases differ in geometric shape.

7. The aerated confection piece of claim 6 wherein the first and second confection phases are offset from a center portion of the body.

8. The aerated confection piece of claim 1 wherein, except for the first and second colors being different, the first and second confection phases are substantially equivalent in moisture level, texture, density and foam cell size distribution.

9. The aerated confection piece of claim 8 wherein the first and second confection phases differ in geometric shape.

10. The aerated confection piece of claim 9 wherein the first and second confection phases are offset from a center portion of the body.

11. An aerated confection piece having a plurality of phases of distinct colors comprising:
    a first confection phase having a first color;
    a second confection phase having a second color which is different from the first color; and
    a third confection phase having a color which is different from the first color, wherein the second and third confection phases are spaced within, extend through and are of unequal proportions to the first confection phase.

12. The aerated confection piece of claim 11 wherein the second and third confection phases are of unequal proportion to each other.

13. The aerated confection piece of claim 11 wherein the confection piece is entirely fabricated from a marshmallow confection.

14. The aerated confection piece of claim 13 wherein the first, second and third confection phases have a similar texture, density and composition.

15. The aerated confection piece of claim 11 wherein the first confection phase wholly defines an outermost periphery of the confection piece, each of the second and third confection phases being entirely located within the outermost periphery.

16. The aerated confection piece of claim 15 wherein the outermost periphery is substantially circular.

17. The aerated confection piece of claim 11 wherein the color of the third confection phase is different from the second color.

18. The aerated confection piece of claim 11 wherein the second and third confection phases exhibit different geometric shapes.

19. The aerated confection piece of claim 11 wherein the weight ratio of the first confection phase to the second confection phase is greater than 1.1.

20. The aerated confection piece of claim 19 wherein the weight ratio of the first confection phase to the second confection phase is greater than 1.5.

21. The aerated confection piece of claim 20 wherein the weight ratio of the first confection phase to the second confection phase ranges from about 1.5 to 20.

22. The aerated confection piece of claim 21 wherein the first confection phase constitutes 60–90% of the aerated confection piece.

23. The aerated confection piece of claim 11 additionally comprising a fourth confection phase provided within the first confection phase, wherein the fourth confection phase is unequal in proportion to any of the first, second and third confection phases.

24. The aerated confection piece of claim 23 wherein the first, second, third and fourth confection phases are all different in color.

25. The aerated confection piece of claim 23 additionally comprising a fifth confection phase provided within the first confection phase, wherein the fifth confection phase is unequal in proportion to any of the first, third and fourth confection phases.

26. The aerated confection piece of claim 25 wherein the fifth confection phase is substantial equal in proportion to the second confection phase.

27. The aerated confection piece of claim 26 wherein the second, third, fourth and fifth confection phases are arranged to collectively resemble facial features within the first confection phase.

28. The aerated confection piece of claim 11 wherein at least the second and third confection phases have dissimilar compositions which dissolve at differing rates when the aerated confection piece is placed in a liquid.

29. The aerated confection piece of claim 11 wherein the aerated confection piece constitutes a marbit having a size count of 1 to 10 pieces/g.

30. The acrated confection piece or claim 11 wherein the aerated confection piece ranges in size from 1 to 2 g.

* * * * *